(12) United States Patent
Kanda et al.

(10) Patent No.: US 9,256,053 B2
(45) Date of Patent: Feb. 9, 2016

(54) IMAGING LENS AND IMAGING APPARATUS INCLUDING THE IMAGING LENS

(71) Applicant: FUJIFILM Corporation, Tokyo (JP)

(72) Inventors: Hideo Kanda, Saitama-ken (JP); Kazumi Koike, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 36 days.

(21) Appl. No.: 14/219,705

(22) Filed: Mar. 19, 2014

(65) Prior Publication Data

US 2014/0293448 A1 Oct. 2, 2014

(30) Foreign Application Priority Data

Mar. 29, 2013 (JP) ................................. 2013-072277

(51) Int. Cl.
*G02B 9/60* (2006.01)
*G02B 13/00* (2006.01)
(52) U.S. Cl.
CPC .............. *G02B 13/0045* (2013.01); *G02B 9/60* (2013.01)

(58) Field of Classification Search
CPC ..... G02B 13/0045; G02B 13/001; G02B 9/60
USPC ........................................................ 359/714
See application file for complete search history.

(56) References Cited

U.S. PATENT DOCUMENTS

2011/0249346 A1    10/2011    Tang et al.
2014/0293445 A1*   10/2014    Yoneyama et al. ........... 359/714
2014/0293451 A1*   10/2014    Yoneyama et al. ........... 359/714

* cited by examiner

*Primary Examiner* — David N Spector
(74) *Attorney, Agent, or Firm* — Young & Thompson

(57) ABSTRACT

An imaging lens substantially consists of, in order from an object side, five lenses of a first lens that has a biconvex shape, a second lens that has a negative refractive power, a third lens that has a negative refractive power and has a meniscus shape which is concave toward the object side, a fourth lens that has a positive refractive power, and a fifth lens that has a negative refractive power and has an aspheric shape which is concave toward an image side and of which an image side surface has an extreme point. Further, the imaging lens satisfies predetermined conditional expressions.

12 Claims, 13 Drawing Sheets

FIG.1　　EXAMPLE 1

FIG.4  EXAMPLE 4

IMAGING LENS AND IMAGING APPARATUS INCLUDING THE IMAGING LENS

BACKGROUND OF THE INVENTION

1. Field of the Invention

The present invention relates to a fixed-focus imaging lens that forms an optical image of a subject on an imaging device, such as a charge coupled device (CCD) and a complementary metal oxide semiconductor (CMOS), and to an imaging apparatus, such as a digital still camera, a cellular phone with a camera, a mobile information terminal (PDA: Personal Digital Assistance), a smartphone, a tablet terminal, and a mobile game machine, on which the imaging lens is mounted to perform photography.

2. Description of the Related Art

As personal computers have become popular in homes, digital still cameras which are capable of inputting image information about photographed scenes, persons, and the like into the personal computers have spread rapidly. Further, a cellular phone, a smartphone, or a tablet terminal in which a camera module for inputting images is installed has been increasing. Such apparatus having an imaging function uses an imaging device, such as a CCD and a CMOS. Recently, because the imaging device has been miniaturized, there has been also a demand to miniaturize the whole of the imaging apparatus and an imaging lens mounted thereon. Further, since the number of pixels included in the imaging device has also been increasing, there has been a demand to enhance the resolution and performance of the imaging lens. For example, there has been a demand for performance corresponding to high resolution of 5 megapixels or higher, and preferably performance corresponding to high resolution of 8 megapixels or higher.

To satisfy such demands, it can be considered that the imaging lens is composed of five or six lenses, which are a relatively large number of lenses. For example, U.S. Patent Application Publication No. 20110249346 (Patent Document 1) proposes an imaging lens composed of five lenses. The imaging lens disclosed in Patent Document 1 substantially consists of, in order from an object side, five lenses of a first lens that has a positive refractive power, a second lens that has a negative refractive power, a third lens that has a negative refractive power, a fourth lens that has a positive refractive power, and a fifth lens that has a negative refractive power.

SUMMARY OF THE INVENTION

In particular, for the imaging lenses used in apparatuses, of which the thickness has been decreased, such as a cellular phone, a smartphone or a tablet terminal, a demand to decrease the total length of the lens has been increased more and more. Hence, it is necessary to further decrease the total length of the imaging lens disclosed in Patent Document 1.

The present invention has been made in view of the above-mentioned circumstances and an object thereof is to provide an imaging lens capable of achieving high imaging performance in the range from the central angle of view to the peripheral angle of view while achieving a decrease in the total length thereof. Another object of the present invention is to provide an imaging apparatus capable of obtaining a photographed image with high resolution through the imaging lens which is mounted thereon.

The imaging lens of the present invention is an imaging lens substantially consisting of, in order from an object side, five lenses of:

a first lens that has a biconvex shape;
a second lens that has a negative refractive power;
a third lens that has a negative refractive power and has a meniscus shape which is concave toward the object side;
a fourth lens that has a positive refractive power; and
a fifth lens that has a negative refractive power and has an aspheric shape which is concave toward an image side and of which an image side surface has an extreme point, in which the following conditional expressions (1) and (2) are satisfied:

$$-2 < f/f45 < 0 \qquad (1), \text{ and}$$

$$0 < f/f4 < 0.84 \qquad (2), \text{ where}$$

f is a focal length of a whole system,
f45 is a composite focal length of the fourth and fifth lenses, and
f4 is a focal length of the fourth lens.

According to the imaging lens of the present invention, in the imaging lens which is composed of five lenses as a whole, a configuration of each lens element of the first to fifth lenses is optimized. Therefore, it is possible to achieve a lens system that has high resolution performance while decreasing the total length thereof.

In the imaging lens of the present invention, the expression "substantially consisting of five lenses" means that the imaging lens of the present invention may include not only the five lenses but also a lens which has substantially no refractive power, optical elements, such as a stop and a cover glass, which are not a lens, mechanism parts, such as a lens flange, a lens barrel, an imaging device and a hand shake blur correction mechanism, and the like. When the lens includes an aspheric surface, the reference sign of the surface shape and refractive power of the lens is considered in a paraxial region.

In the imaging lens of the present invention, by employing and satisfying the following desirable configuration, it is possible to make the optical performance thereof better.

In the imaging lens of the present invention, it is desirable that the second lens be concave toward the image side.

In the imaging lens of the present invention, it is desirable that the fourth lens have a meniscus shape which is concave toward the object side.

In the imaging lens of the present invention, it is desirable that among absolute values of respective focal lengths of the first to fifth lenses, an absolute value of a focal length of the third lens be the maximum.

It is desirable that the imaging lens of the present invention satisfy any of the following conditional expressions (1-1) to (3-2). It should be noted that, as a desirable mode, any one of the conditional expressions (1-1) to (3-2) may be satisfied, or an arbitrary combination thereof may be satisfied.

$$-1.62 < f/f45 < -0.15 \qquad (1-1),$$

$$-1.3 < f/f45 < -0.3 \qquad (1-2),$$

$$0.05 < f/f4 < 0.82 \qquad (2-1),$$

$$0.1 < f/f4 < 0.8 \qquad (2-2),$$

$$-1 < (R3f - R3r)/(R3f + R3r) < 0 \qquad (3),$$

$$-0.5 < (R3f - R3r)/(R3f + R3r) < -0.01 \qquad (3-1), \text{ and}$$

$$-0.1 < (R3f - R3r)/(R3f + R3r) < -0.03 \qquad (3-2), \text{ where}$$

f is a focal length of a whole system, f45 is a composite focal length of the fourth and fifth lenses, f4 is a focal length of the fourth lens, R3r is a paraxial radius of curvature of an image side surface of the third lens, and R3f is a paraxial radius of curvature of an object side surface of the third lens.

The imaging apparatus of the present invention includes the imaging lens of the present invention.

According to the imaging lens of the present invention, in the imaging lens which is composed of five lenses as a whole, a configuration of each lens element is optimized, and particularly the shape of the fifth lens is appropriately formed. Therefore, it is possible to achieve a lens system that has high resolution performance in the range from the central angle of view to the peripheral angle of view while decreasing the total length thereof.

Further, according to the imaging apparatus of the present invention, imaging signals based on an optical image formed by the imaging lens of the present invention, which has high imaging performance, are output. Therefore, it is possible to obtain a photographed image with high resolution.

DESCRIPTION OF THE PREFERRED EMBODIMENTS

Hereinafter, embodiments of the present invention will be described in detail with reference to the accompanying drawings.

Figure 1:
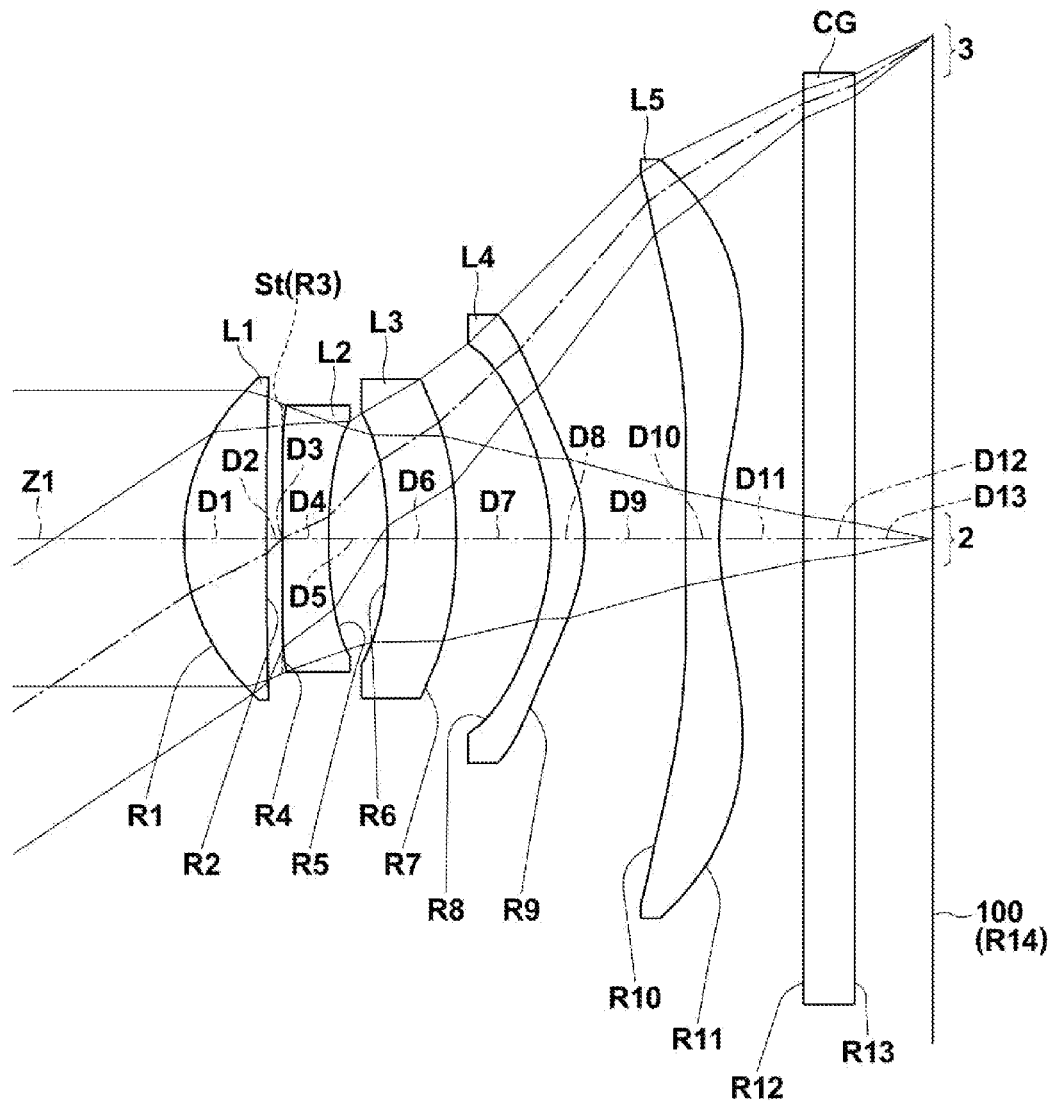
FIG. 1 is a lens cross-sectional view illustrating a first configuration example of an imaging lens according to an embodiment of the present invention and corresponding to Example 1.
Figure 2:
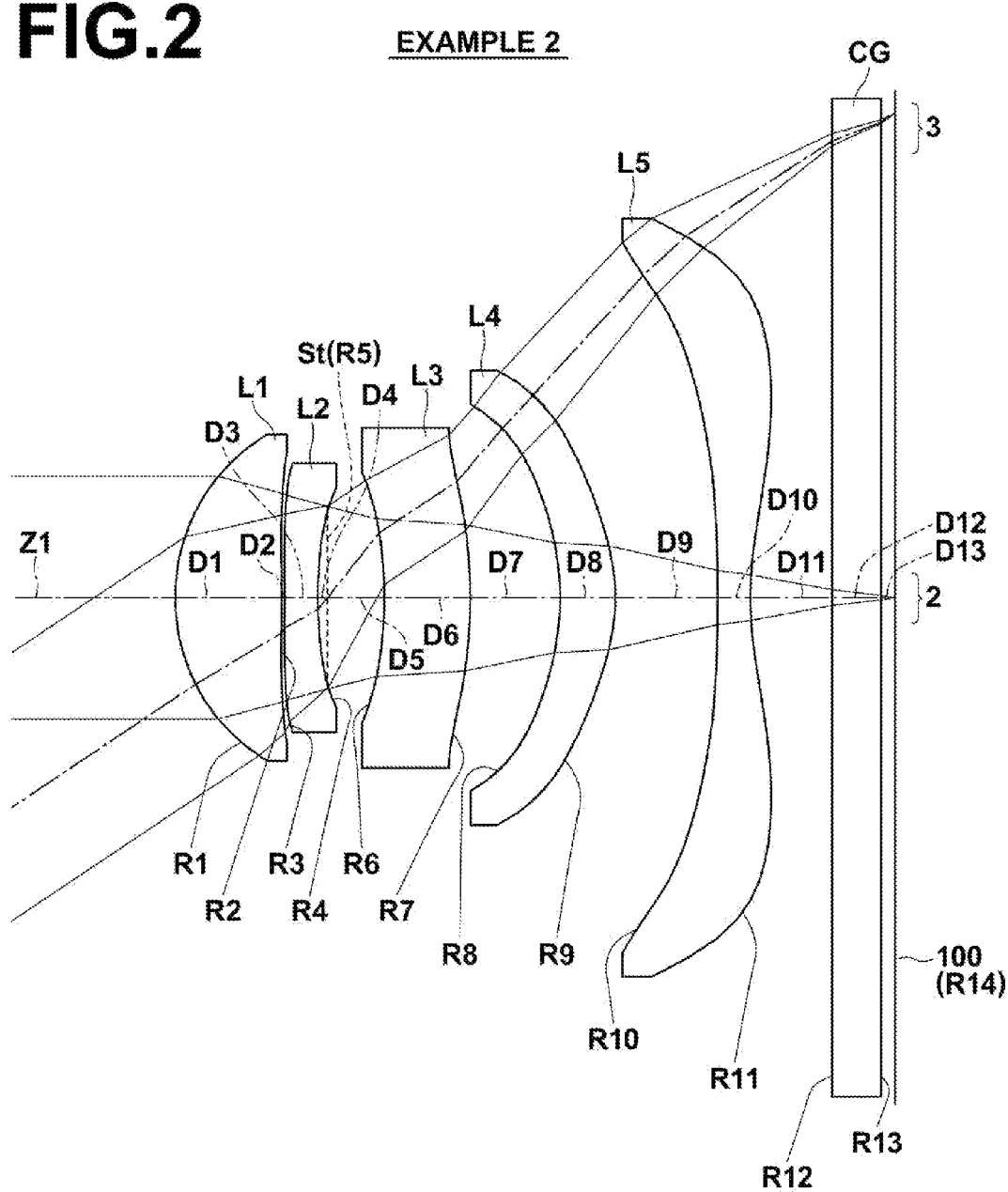
FIG. 2 is a lens cross-sectional view illustrating a second configuration example of an imaging lens according to an embodiment of the present invention and corresponding to Example 2.
Figure 3:
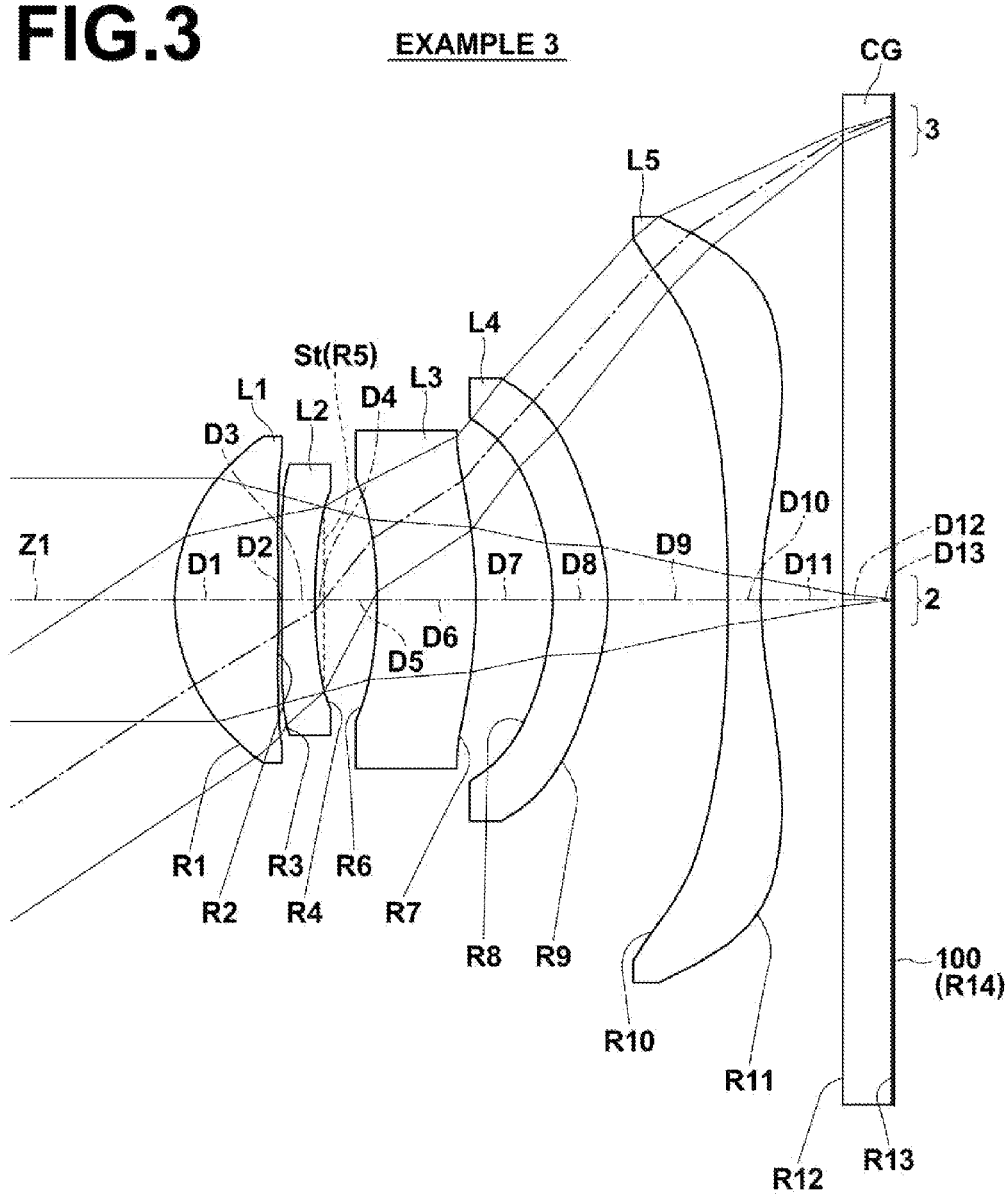
FIG. 3 is a lens cross-sectional view illustrating a third configuration example of an imaging lens according to an embodiment of the present invention and corresponding to Example 3.
Figure 4:
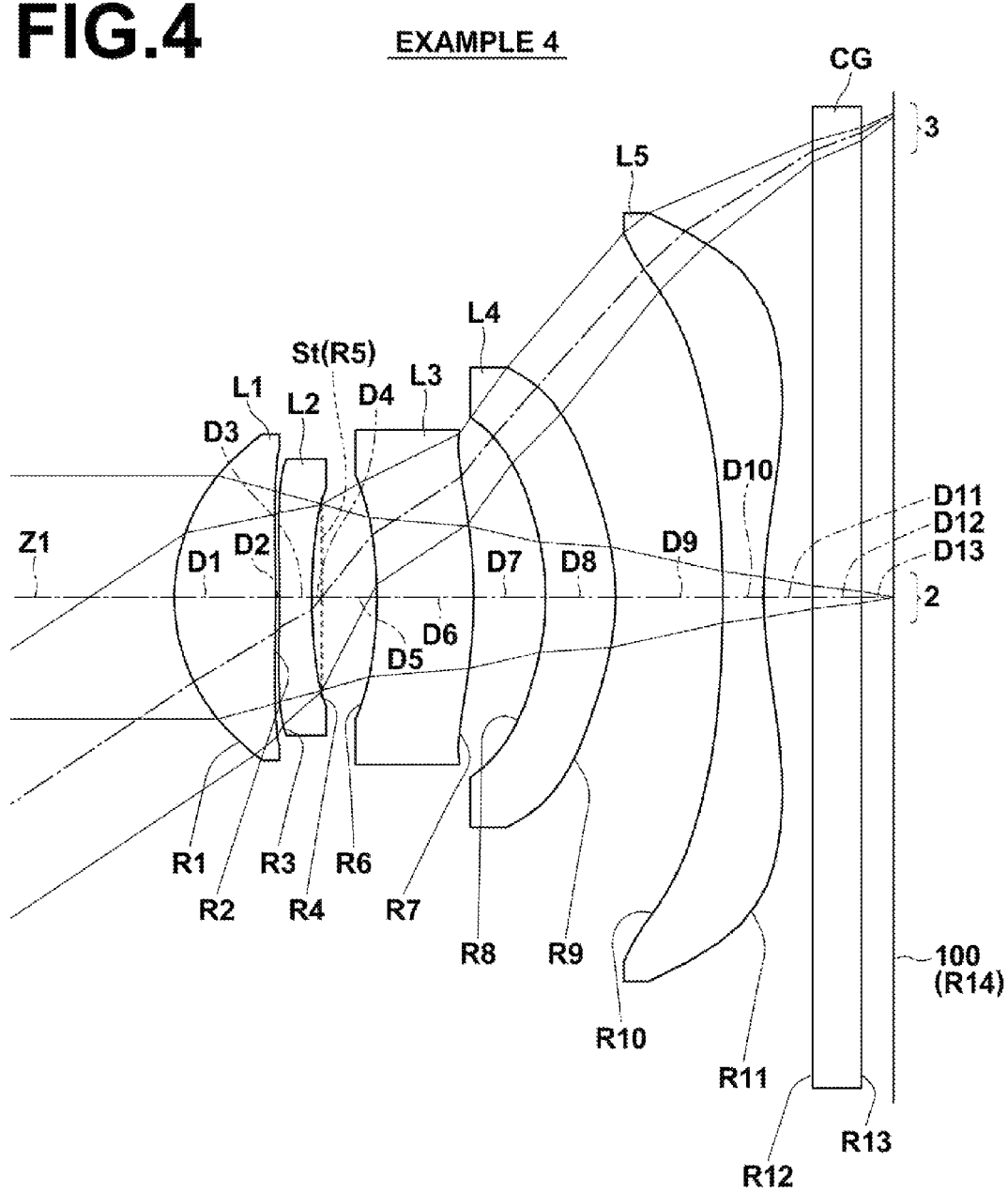
FIG. 4 is a lens cross-sectional view illustrating a fourth configuration example of an imaging lens according to an embodiment of the present invention and corresponding to Example 4.
Figure 5:
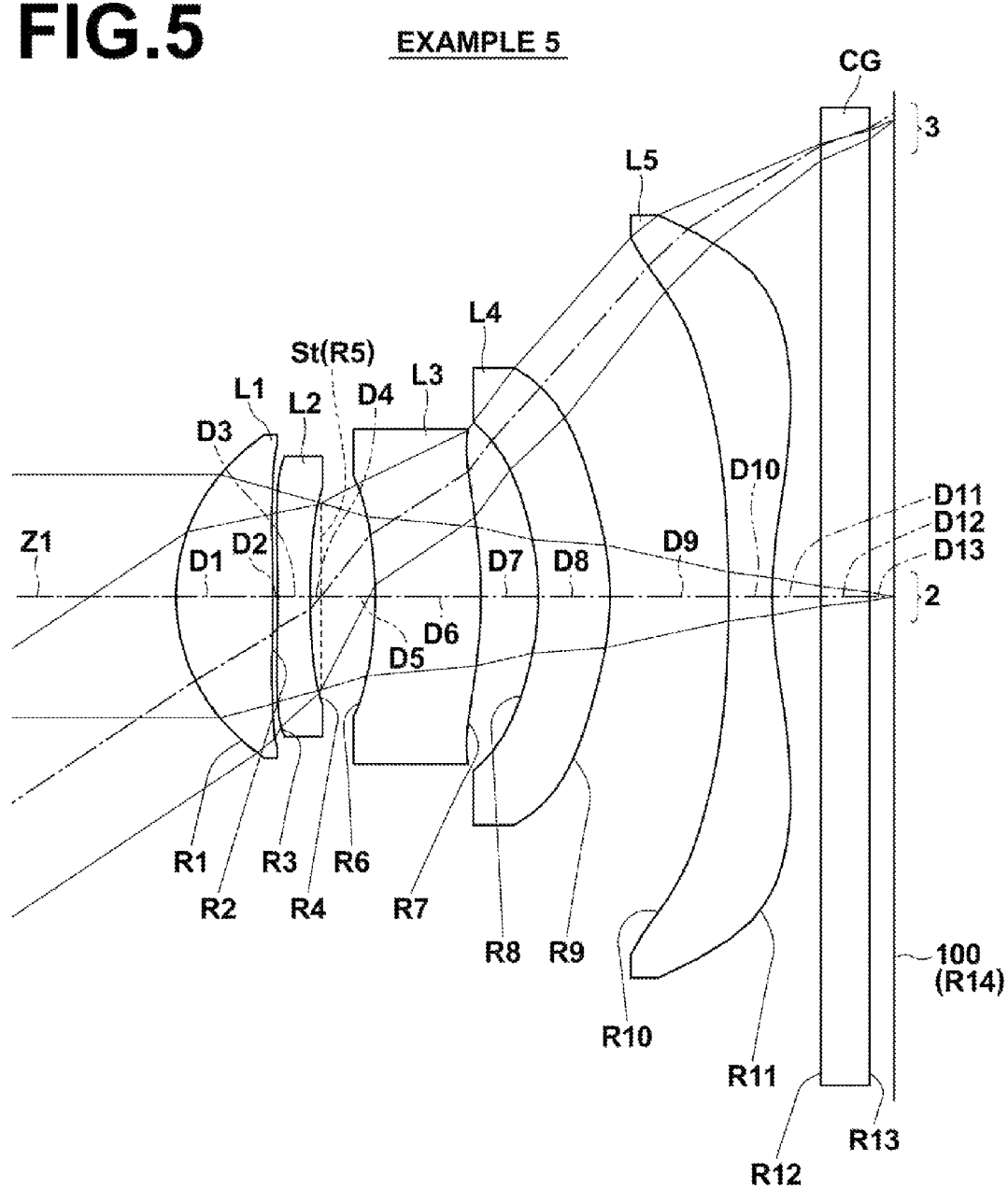
FIG. 5 is a lens cross-sectional view illustrating a fifth configuration example of an imaging lens according to an embodiment of the present invention and corresponding to Example 5.
Figure 6:
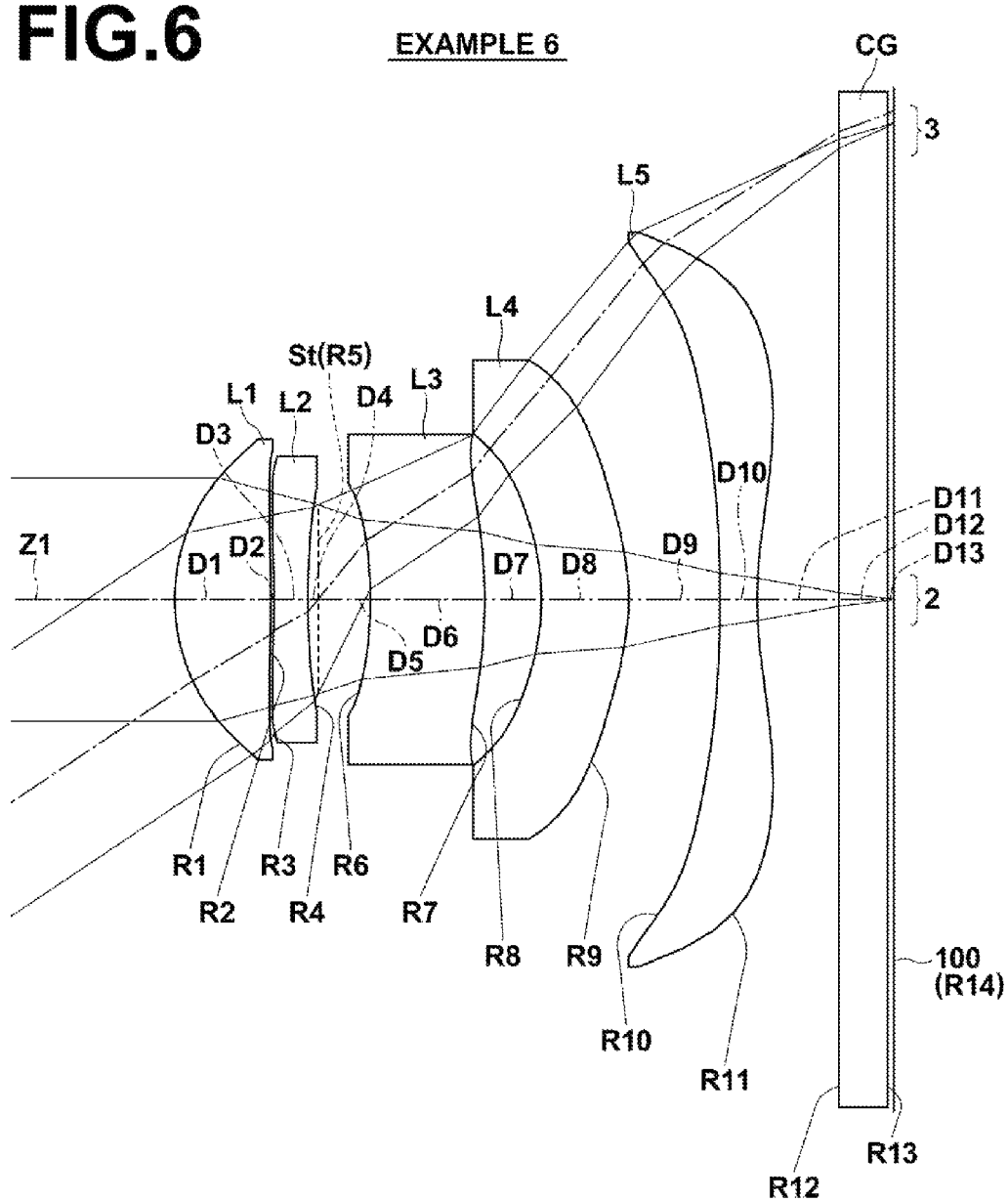
FIG. 6 is a lens cross-sectional view illustrating a sixth configuration example of an imaging lens according to an embodiment of the present invention and corresponding to Example 6.

FIG. 1 shows a first configuration example of an imaging lens according to a first embodiment of the present invention. The configuration example corresponds to a lens configuration of a first numerical value example (Table 1 and Table 2) to be described later. Likewise, FIGS. 2 to 6 show cross sections of second to sixth configuration examples corresponding to the imaging lenses according to second to sixth embodiments to be described later. The second to sixth configuration examples correspond to lens configurations of the second to sixth numerical value examples (Tables 3 to 12) to be described later. In FIGS. 1 to 6, the reference sign Ri represents a radius of curvature of i-th surface, where the number is the sequential number that sequentially increases as it gets closer to an image side (an imaging side) when a surface of a lens element closest to an object side is regarded as a first surface. The reference sign Di represents an on-axis surface spacing between i-th surface and (i+1)th surface on an optical axis Z1. Since the respective configuration examples are basically similar in configuration, the following description will be given on the basis of the first configuration example of the imaging lens shown in FIG. 1, and the configuration examples shown in FIGS. 2 to 6 will be also described as necessary. Further, FIGS. 1 to 6 also show the optical paths of on-axis rays 2 from the object point at an infinite distance, and rays 3 at the maximum angle of view.

An imaging lens L according to an embodiment of the present invention is appropriate to be used in various kinds of imaging apparatuses using imaging devices such as a CCD and a CMOS. Especially, the imaging lens L is appropriate to be used in relatively small-sized mobile terminal apparatus, for example, such as a digital still camera, a cellular phone with a camera, a smartphone, a tablet terminal, and a PDA. This imaging lens L includes, along the optical axis Z1, a first lens L1, a second lens L2, a third lens L3, a fourth lens L4, and a fifth lens L5 in this order from the object side.

Figure 13:
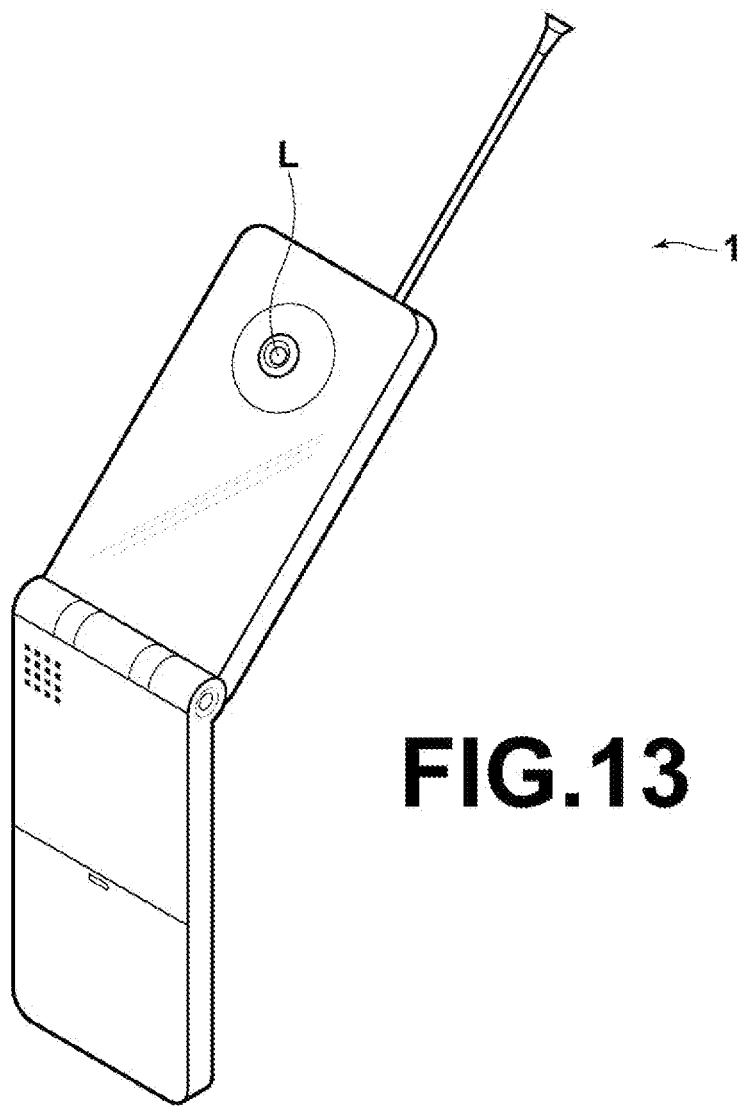
FIG. 13 is a diagram illustrating an imaging apparatus which is a cellular phone terminal including the imaging lens according to the present invention.

FIG. 13 is a schematic diagram illustrating a cellular phone terminal, which is an imaging apparatus 1 according to an embodiment of the present invention. The imaging apparatus 1 according to the embodiment of the present invention includes imaging lens L according to the present embodiment and an imaging device 100 (refer to FIG. 1), such as a CCD, which outputs imaging signals based on an optical image formed by the imaging lens L. The imaging device 100 is disposed at an image formation surface (image plane R14) of the imaging lens L.

Figure 14:
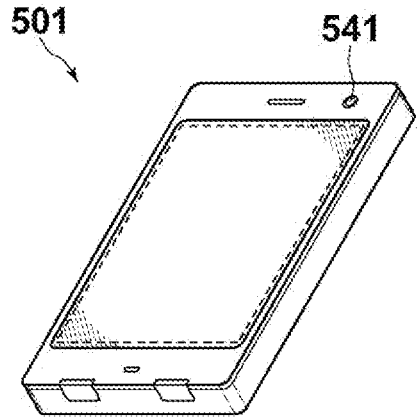
FIG. 14 is a diagram illustrating an imaging apparatus which is a smartphone including the imaging lens according to the present invention.

FIG. 14 is a schematic diagram illustrating a smartphone which is an imaging apparatus 501 according to an embodiment of the present invention. The imaging apparatus 501 according to the embodiment of the present invention includes a camera unit 541 including the imaging lens L according to the present embodiment and the imaging device 100 (refer to FIG. 1), such as a CCD, which outputs imaging signals based on an optical image formed by the imaging lens L. The imaging device 100 is disposed at the image formation surface (image plane R14) of the imaging lens L.

Various optical members CG may be disposed between the fifth lens L5 and the imaging device 100 based on the configuration of a camera on which the imaging lens is mounted. For example, a flat-plate-shaped optical member, such as a cover glass for protecting an imaging surface and an infrared-ray cut filter, may be disposed. In this case, for example, a flat-plate-shaped cover glass to which a coating having an effect of a filter, such as an infrared-ray cut filter and an ND filter, has been applied, or a material having the same effect may be used as the optical member CG.

Alternatively, an effect similar to the optical member CG may be given to the fifth lens L5 or the like by applying a coating to the fifth lens L5 or the like without using the optical member CG. Thereby, it is possible to reduce the number of components, and to reduce the total length.

Further, it is desirable that the imaging lens L include an aperture stop St. The imaging lens according to the first embodiment shown in FIG. 1 is a configuration example in which the aperture stop St is disposed between the first lens L1 and the second lens L2, and the imaging lenses according to the second to sixth embodiments shown in FIGS. 2 to 6 are configuration examples in which the aperture stop St is disposed between the second lens L2 and the third lens L3.

In the imaging lens L, the first lens L1 has a positive refractive power, and has a biconvex shape in the vicinity of the optical axis. Thereby, it is possible to provide a sufficient refractive power to the first lens L1 without making the absolute value of the radius of curvature of each surface of the first lens L1 smaller than necessary, and thus it is possible to appropriately reduce the total lens length while satisfactorily correcting a spherical aberration and astigmatism. As shown in the first to sixth embodiments, when the absolute value of the radius of curvature of the object side surface of the first lens L1 is set to be smaller than the absolute value of the radius of curvature of the image side surface of the first lens L1, it is possible to more appropriately reduce the total length. Further, by forming the first lens L1 in an aspheric shape, it is possible to more appropriately correct a spherical aberration.

The second lens L2 has a negative refractive power in the vicinity of the optical axis. Further, it is desirable that the second lens L2 be concave toward the image side in the vicinity of the optical axis. In this case, it is possible to satisfactorily correct a spherical aberration and a longitudinal chromatic aberration which are caused when the rays pass through the first lens L1, and thus it becomes easy to reduce the total length.

The third lens L3 has a negative refractive power. Further, the third lens L3 has a meniscus shape which is concave toward the object side in the vicinity of the optical axis. Thereby, compared with a case where each surface of the third lens L3 is concave toward the image side in the vicinity of the optical axis, it is possible to correct a spherical aberration with good balance while suppressing occurrence of astigmatism and a comatic aberration in the whole area of a screen.

Further, it is desirable that an absolute value |f3| of the focal length of the third lens L3 be set to the maximum among absolute values |f1| to |f5| of the focal lengths of the first to fifth lenses L1 to L5. In this case, it is possible to more appropriately reduce an effect of change in a shape of the surface of the third lens L3 on the focal length f of the whole system, and thus the third lens L3 can be flexibly designed to have a shape of the surface appropriate for correcting various aberrations.

The fourth lens L4 has a positive refractive power in the vicinity of the optical axis. As shown in the first to sixth embodiments, it is desirable that the fourth lens L4 have a meniscus shape which is concave toward the object side in the vicinity of the optical axis. Thereby, compared with a case where each surface of the fourth lens L4 is concave toward the image side in the vicinity of the optical axis, it is possible to further decrease the incident angle of the rays which are incident onto each surface of the fourth lens L4, and thus it is possible to correct a spherical aberration with good balance while suppressing occurrence of astigmatism and a comatic aberration.

The fifth lens L5 has a negative refractive power in the vicinity of the optical axis. By making the fifth lens L5, which is disposed to be closest to the image side of the imaging lens, have a negative refractive power, it is possible to appropriately reduce the total length. Further, since the fifth lens L5 having a negative refractive power is disposed on the image side of the fourth lens L4 having a positive refractive power, it is possible to appropriately correct a lateral chromatic aberration and a curvature of field.

Further, the fifth lens L5 is concave toward the image side in the vicinity of the optical axis, and has an aspheric shape of which an image side surface has an extreme point. Hence, while obtaining an effect of reduction in the total length by applying the negative refractive power of the surface shape in the vicinity of the optical axis of the image side surface of the fifth lens L5, it is possible to suppress occurrence of distortion (distortion aberration) in a positive direction by applying the positive refractive power of the surface shape outside the extreme point of the image side surface of the fifth lens L5 in the radial direction. Further, by making the fifth lens L5 have the aspheric shape which is concave toward the image side in the vicinity of the optical axis and has an extreme point on the image side surface, it is possible to satisfactorily correct a curvature of field, and thus it is possible to achieve high resolution performance in the range from the central angle of view to the peripheral angle of view. In order to achieve this effect, the extreme point of the image side surface of the fifth lens L5 can be disposed at an arbitrary position inside of the intersection point between the image side surface of the fifth lens L5 and the principal ray with the maximum angle of view in the radial direction of the fifth lens L5.

It should be noted that, in the present description, the "extreme point" means a point at which a function fx(r) is at a maximum value or a minimum value when a point on the lens surface within the effective diameter is represented by (r, fx(r)). Here, the distance from the optical axis in a direction perpendicular to the optical axis is r (r>0), and a function representing the position at the distance r in the optical axis direction is fx(r). All the extreme points of the respective embodiments of the present description are extreme points at which the tangent plane is perpendicular to the optical axis.

Further, by making the fifth lens L5 concave toward the image side and making the image side surface of the fifth lens L5 have an aspheric shape which has at least one extreme point, especially in the peripheral portion of the imaging area, it is possible to prevent the angle of incidence of rays, which pass through the optical system and are incident onto the imaging surface (imaging device), from becoming large. It should be noted that the peripheral portion of the imaging area described herein means the outside of about 50% of the height in the radial direction. Here, the height is a height of the intersection point between the principal ray with the maximum angle of view and the surface from the optical axis.

According to the imaging lens L, in the imaging lens which is composed of five lenses as a whole, a configuration of each lens element of the first to fifth lenses L1 to L5 is optimized. Therefore, it is possible to achieve a lens system that has high resolution performance while decreasing the total length thereof.

In the imaging lens L, in order to enhance the performance thereof, it is desirable that at least one surface of each lens of the first to fifth lenses L1 to L5 be formed as an aspheric surface.

Further, it is desirable that each of the lenses L1 to L5 constituting the imaging lens L be not formed as a cemented lens but a single lens. The reason is that, compared with a case where any of the lenses L1 to L5 is formed as a cemented lens, since the number of aspheric surfaces increases, a degree of freedom in design of each lens is enhanced, and it is possible to appropriately achieve reduction in the total length thereof.

Further, for example, as in the imaging lenses according to the first to sixth embodiments, when each lens configuration of the first to fifth lenses L1 to L5 of the imaging lens L is set such that the total angle of view is equal to or greater than 60 degrees, the imaging lens L can be appropriately applied to a cellular phone terminal and the like which are often used in a close-up shot.

Next, effects and advantages of the conditional expressions of the imaging lens L configured as shown above will be described in detail. It should be noted that the imaging lens L satisfies the conditional expressions (1) and (2) to be described later. Further, regarding conditional expressions excluding the conditional expressions (1) and (2) (conditional expressions (1-1) to (3-2)) to be described later, it is desirable that the imaging lens L satisfy any one or an arbitrary combination of the conditional expressions. It is desirable that the conditional expressions to be satisfied be appropriately selected in accordance with factors required for the imaging lens L.

First, a focal length f of the whole system and a composite focal length f45 of the fourth and fifth lenses L4 and L5 satisfy the following conditional expression (1).

$$-2 < f/f45 < 0 \quad (1)$$

The conditional expression (1) defines a desirable numerical range of a ratio of the focal length f of the whole system to the composite focal length f45 of the fourth and fifth lenses L4 and L5. By suppressing the negative composite refractive power of the fourth and fifth lenses L4 and L5 such that f/f45 is greater than the lower limit of the conditional expression (1), it is not necessary to make the positive refractive power of the first lens group, which is composed of the first to third lenses L1 to L3, stronger than necessary, and it is possible to suppress occurrence of a high-order spherical aberration and a comatic aberration. Thus, it is possible to appropriately achieve reduction in total length and high resolution performance. Further, it is advantageous in reducing the total length to secure the negative composite refractive power of the fourth and fifth lenses L4 and L5 such that f/f45 is less than the upper limit of the conditional expression (1). In order to further enhance the effect, it is more desirable to satisfy the conditional expression (1-1), and it is even more desirable to satisfy the conditional expression (1-2).

$$-1.62 < f/f45 < -0.15 \quad (1\text{-}1)$$

$$-1.3 < f/f45 < -0.3 \quad (1\text{-}2)$$

Further, the focal length f of the whole system and the focal length f4 of the fourth lens L4 satisfy the following conditional expression (2).

$$0 < f/f4 < 0.84 \quad (2)$$

The conditional expression (2) defines a desirable numerical range of a ratio of the focal length f of the whole system to the focal length f4 of the fourth lens L4. By securing the refractive power of the fourth lens L4 such that f/f4 is greater than the lower limit of the conditional expression (2), the positive refractive power of the fourth lens L4 does not become excessively weak relative to the refractive power of the whole system, and thus it is possible to appropriately correct a lateral chromatic aberration. By maintaining the refractive power of the fourth lens L4 such that f/f4 is less than the upper limit of the conditional expression (2), the positive refractive power of the fourth lens L4 does not become excessively strong relative to the refractive power of the whole system, and it is possible to set the negative refractive power of the fifth lens L5, which is disposed on the image side of the fourth lens L4, with balance so as to be advantageous in correcting various aberrations. Hence, it is possible to satisfactorily correct a lateral chromatic aberration, astigmatism, a comatic aberration, and distortion. In order to further enhance the effect, it is more desirable to satisfy the conditional expression (2-1), and it is even more desirable to satisfy the conditional expression (2-2).

$$0.05 < f/f4 < 0.82 \quad (2\text{-}1)$$

$$0.1 < f/f4 < 0.8 \quad (2\text{-}2)$$

It is desirable that the paraxial radius of curvature R3f of the object side surface of the third lens L3 and the paraxial radius of curvature R3r of the image side surface of the third lens L3 satisfy the following conditional expression (3).

$$-0.1 < (R3f - R3r)/(R3f + R3r) < 0 \quad (3)$$

The conditional expression (3) defines each of a desirable numerical range of the paraxial radius of curvature R3f of the object side surface of the third lens L3 and a desirable numerical range of the paraxial radius of curvature R3r of the image side surface of the third lens L3. By setting the paraxial radius of curvature R3f of the object side surface of the third lens L3 and the paraxial radius of curvature R3r of the image side surface of the third lens L3 such that (R3f−R3r)/(R3f+R3r) is greater than the lower limit of the conditional expression (3), it is possible to suppress occurrence of a spherical aberration. By setting the paraxial radius of curvature R3f of the object side surface of the third lens L3 and the paraxial radius of curvature R3r of the image side surface of the third lens L3 such that (R3f−R3r)/(R3f+R3r) is less than the upper limit of the conditional expression (3), it is possible to correct a spherical aberration, astigmatism, and a comatic aberration with good balance. In order to further enhance this effect, it is more desirable to satisfy the following conditional expression (3-1), and it is even more desirable to satisfy the conditional expression (3-2).

$$-0.5<(R3f-R3r)/(R3f+R3r)<-0.01 \quad (3\text{-}1)$$

$$-0.1<(R3f-R3r)/(R3f+R3r)<-0.03 \quad (3\text{-}2)$$

As described above, according to the imaging lens of the embodiment of the present invention, in the imaging lens which is composed of five lenses as a whole, the configuration of each lens element is optimized. Therefore, it is possible to achieve a lens system that has high resolution performance while decreasing the total length thereof.

The aforementioned imaging lens substantially consists of, in order from the object side: a first lens having a positive refractive power; a second lens having a negative refractive power; a third lens having a negative refractive power; a fourth lens having a positive refractive power; and a fifth lens having a negative refractive power. In addition, the lens is composed of a first lens group, which includes the first to third lenses and has a positive refractive power, and a second lens group which includes the fourth lens and the fifth lens and has a negative refractive power. Hence, by making the whole imaging lens have a telephoto type configuration in which the first lens group having the positive refractive power and the second lens group having the negative refractive power are disposed in order from the object side, it is possible to appropriately reduce the total length. Further, in the imaging lens, by satisfying the conditional expressions (1) and (2) and appropriately setting the refractive powers of the fourth lens L4 and the fifth lens L5, the effect of reduction in the total length is further enhanced. For example, assuming that the distance on the optical axis from the object side surface of the first lens L1 to the image plane (the total length of the imaging lens) is L and the focal length of the whole system is f, in the first to sixth embodiments, a telephoto ratio L/f, which indicates a ratio of the total lens length to the focal length f of the whole system, is about 1.01 to 1.025.

In contrast, in the lens system disclosed in Patent Document 1, the refractive power of the second lens group composed of the fourth lens and the fifth lens is not appropriately set, and thus the total lens length is not sufficiently reduced. For example, a telephoto ratio L/f of the lens system disclosed in Patent Document 1 is about 1.027.

By satisfying appropriately desirable conditions, it is possible to achieve higher imaging performance. Furthermore, according to the imaging apparatus of the embodiment, imaging signals based on an optical image, which is formed by the high-performance imaging lens according to the embodiment, are output. Therefore, it is possible to obtain a photographed image with high resolution in the range from the central angle of view to the peripheral angle of view.

Next, specific numerical examples of the imaging lens according to the embodiment of the present invention will be described. Hereinafter, a plurality of numerical examples will be described collectively.

Table 1 and Table 2, which will be given later, show specific lens data corresponding to the configuration of the imaging lens shown in FIG. 1. Specifically, Table 1 shows basic lens data, and Table 2 shows data on aspheric surfaces. In the lens data shown in Table 1, the column of surface number Si shows the surface number of the i-th surface in the imaging lens of Example 1. The surface of the lens element closest to the object side is the first surface (the aperture stop St is the first), and surface numbers sequentially increase toward the image side. The column of the radius of curvature Ri shows values (mm) of the radius of curvature of i-th surface from the object side to correspond to the reference sign Ri in FIG. 1. Likewise, the column of the on-axis surface spacing Di shows spaces (mm) on the optical axis between the i-th surface Si and the (i+1)th surface Si+1 on the optical axis from the object side. The column of Ndj shows values of the refractive index of the j-th optical element from the object side for the d-line (587.56 nm). The column of vdj shows values of the Abbe number of the j-th optical element from the object side for the d-line.

In the imaging lens according to Example 1, both surfaces of each of the first to fifth lenses L1 to L5 are aspheric. In the basic lens data shown in Table 1, the radii of curvature of these aspheric surfaces are represented as numerical values of the radius of curvature near the optical axis (paraxial radius of curvature).

Table 2 shows aspheric surface data in the imaging lens system according to Example 1. In the numerical values represented as the aspheric surface data, the reference sign "E" means that a numerical value following this is a "exponent" having a base of 10 and that this numerical value having a base of 10 and expressed by an exponential function is multiplied by a numerical value before the "E". For example, this means that "1.0E-02" is "$1.0 \times 10^{-2}$".

As aspheric surface data, values of coefficients Ai and KA in the aspheric surface expression represented by the following expression (A) are shown. Specifically, Z represents the length (mm) of a perpendicular from a point on an aspheric surface at height h from an optical axis to a plane that contacts with the vertex of the aspheric surface (the plane perpendicular to the optical axis).

$$Z=C \cdot h^2/\{1+(1-KA \cdot C^2 \cdot h^2)^{1/2}\}+\Sigma Ai \cdot h^i \quad (A)$$

Here,

Z is a depth of the aspheric surface (mm), h is a distance (height) from the optical axis to the lens surface (mm), C is a paraxial curvature=1/R (R: a paraxial radius of curvature), Ai is an i-th order aspheric surface coefficient (i is an integer equal to or greater than 3), and KA is an aspheric surface coefficient.

As in the imaging lens according to the above-mentioned Example 1, Tables 3 to 12 show specific lens data as Examples 2 to 6, corresponding to the configuration of the imaging lenses shown in FIGS. 2 to 6. In the imaging lenses according to Examples 1 to 6, both surfaces of each of the first to fifth lenses L1 to L5 are aspheric.

Figure 7:
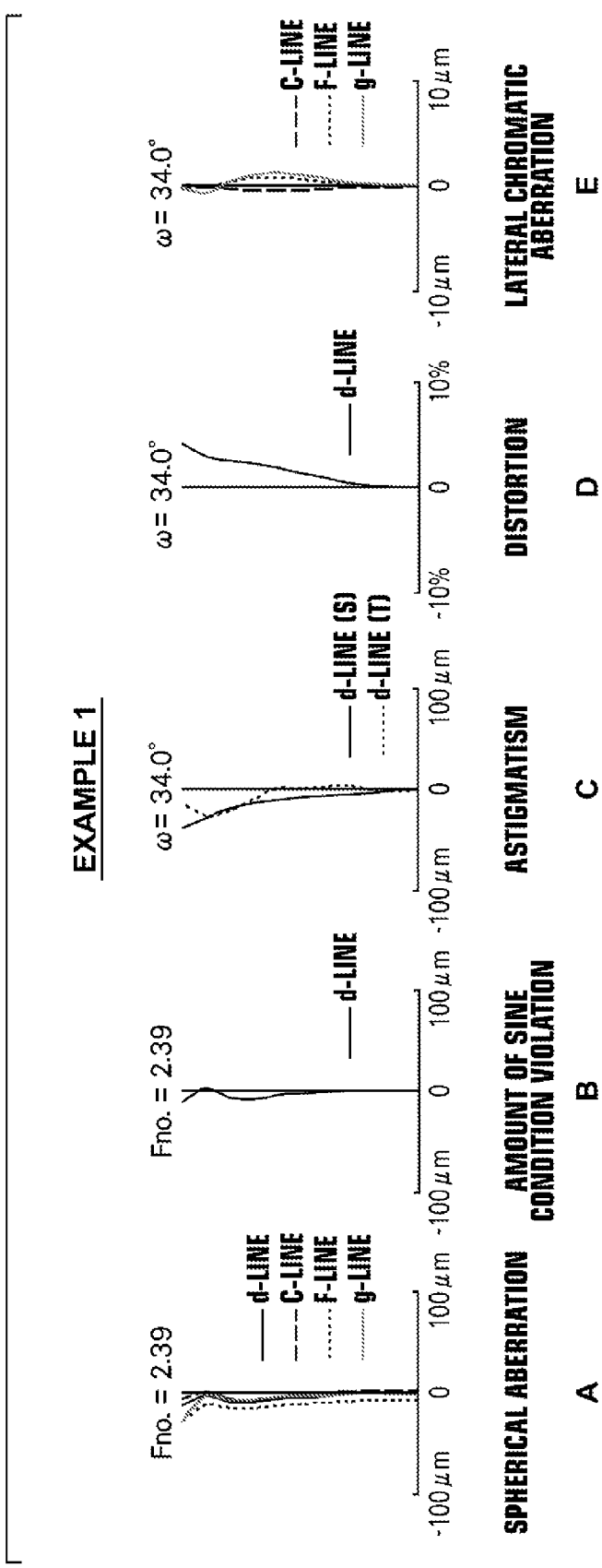
FIG. 7 is an aberration diagram illustrating various aberrations of an imaging lens according to Example 1 of the present invention, where Section A shows a spherical aberration, Section B shows an amount of sine condition violation, Section C shows astigmatism (curvature of field), Section D shows distortion, and Section E shows a lateral chromatic aberration.

FIG. 7, Section A to Section E show a spherical aberration, an amount of sine condition violation, astigmatism (curvature of field), distortion (a distortion aberration), and a lateral chromatic aberration (a chromatic aberration of magnification) in the imaging lens of Example 1, respectively. Each aberration diagram illustrating a spherical aberration, an amount of sine condition violation, astigmatism (curvature of field), and distortion (a distortion aberration) shows an aberration for the d-line (a wavelength of 587.56 nm) as a reference wavelength. The diagram of a spherical aberration diagram and the diagram of a lateral chromatic aberration diagram show also aberrations for the F-line (a wavelength of 486.1 nm) and the C-line (a wavelength of 656.27 nm). The diagram of a spherical aberration also shows an aberration for the g-line (a wavelength of 435.83 nm). In the diagram of astigmatism, the solid line indicates an aberration in the sagittal direction (S), and the broken line indicates an aberration in the tangential direction (T) Fno. indicates an F-number, and ω indicates a half angle of view.

Figure 8:
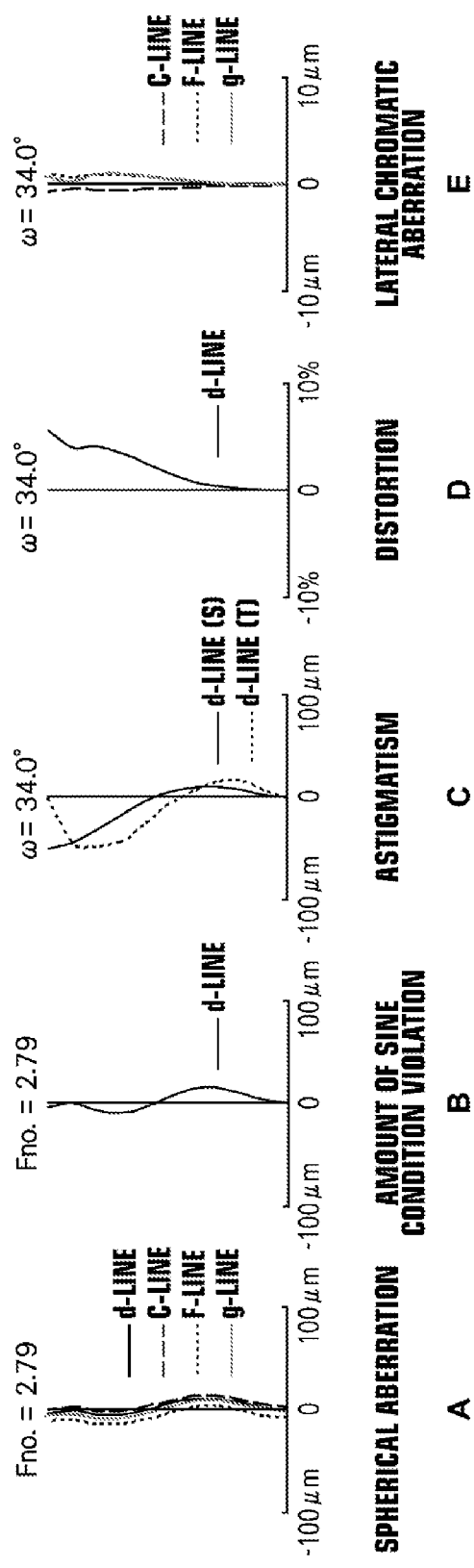
FIG. 8 is an aberration diagram illustrating various aberrations of an imaging lens according to Example 2 of the present invention, where Section A shows a spherical aberration, Section B shows an amount of sine condition violation, Section C shows astigmatism (curvature of field), Section D shows distortion, and Section E shows a lateral chromatic aberration.
Figure 9:
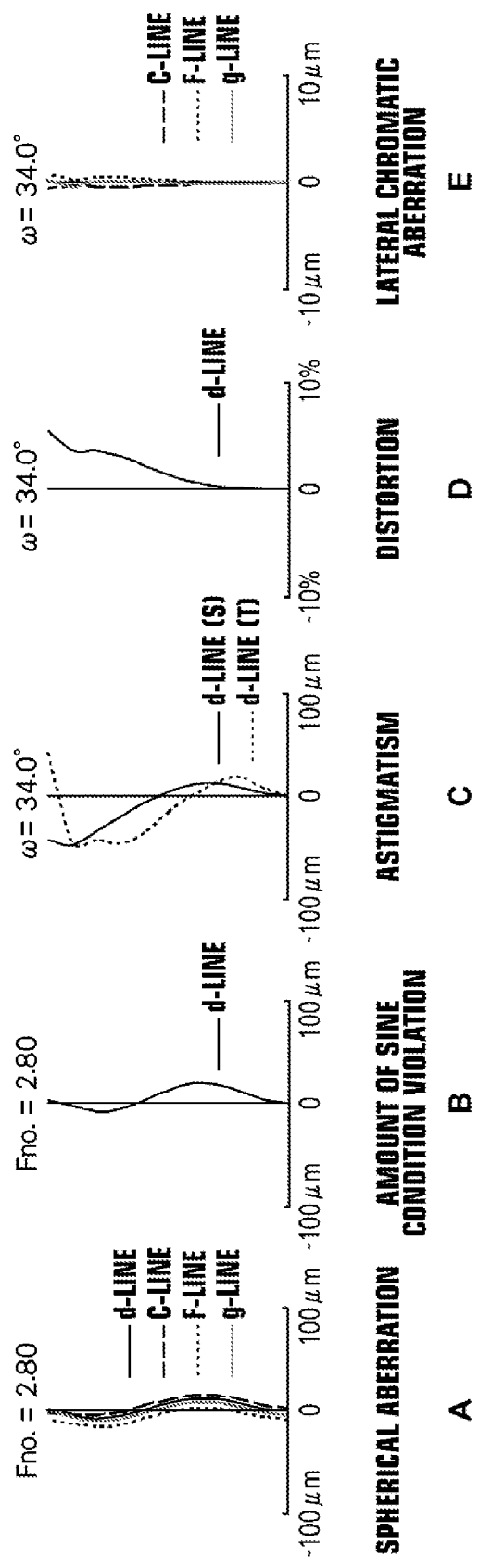
FIG. 9 is an aberration diagram illustrating various aberrations of an imaging lens according to Example 3 of the present invention, where Section A shows a spherical aberration, Section B shows an amount of sine condition violation, Section C shows astigmatism (curvature of field), Section D shows distortion, and Section E shows a lateral chromatic aberration.
Figure 10:
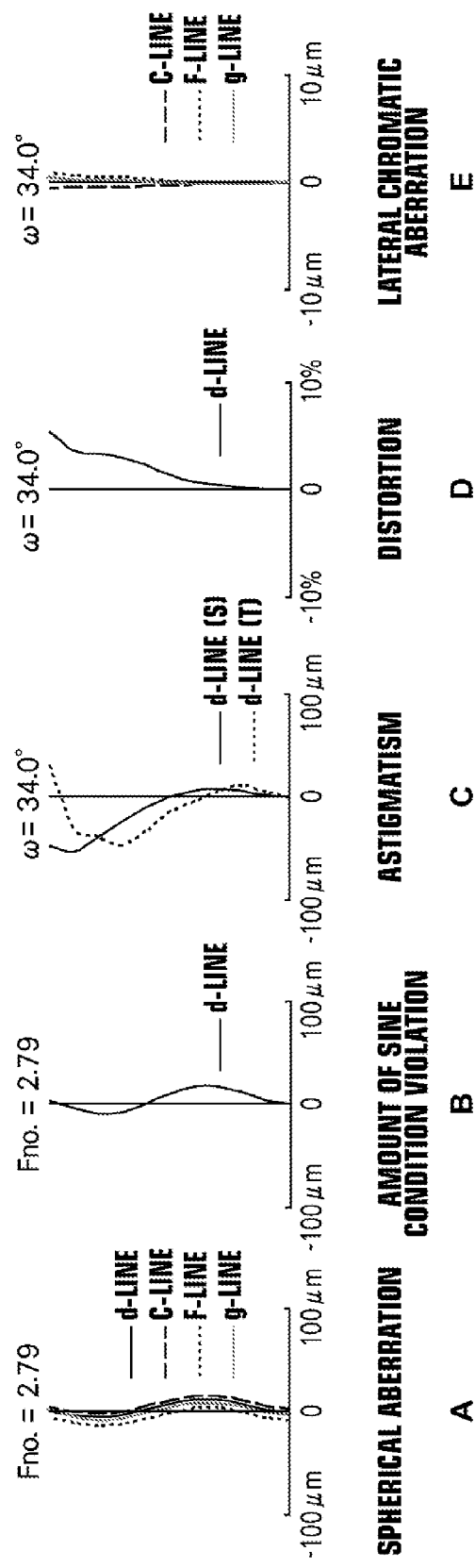
FIG. 10 is an aberration diagram illustrating various aberrations of an imaging lens according to Example 4 of the present invention, where Section A shows a spherical aberration, Section B shows an amount of sine condition violation, Section C shows astigmatism (curvature of field), Section D shows distortion, and Section E shows a lateral chromatic aberration.
Figure 11:
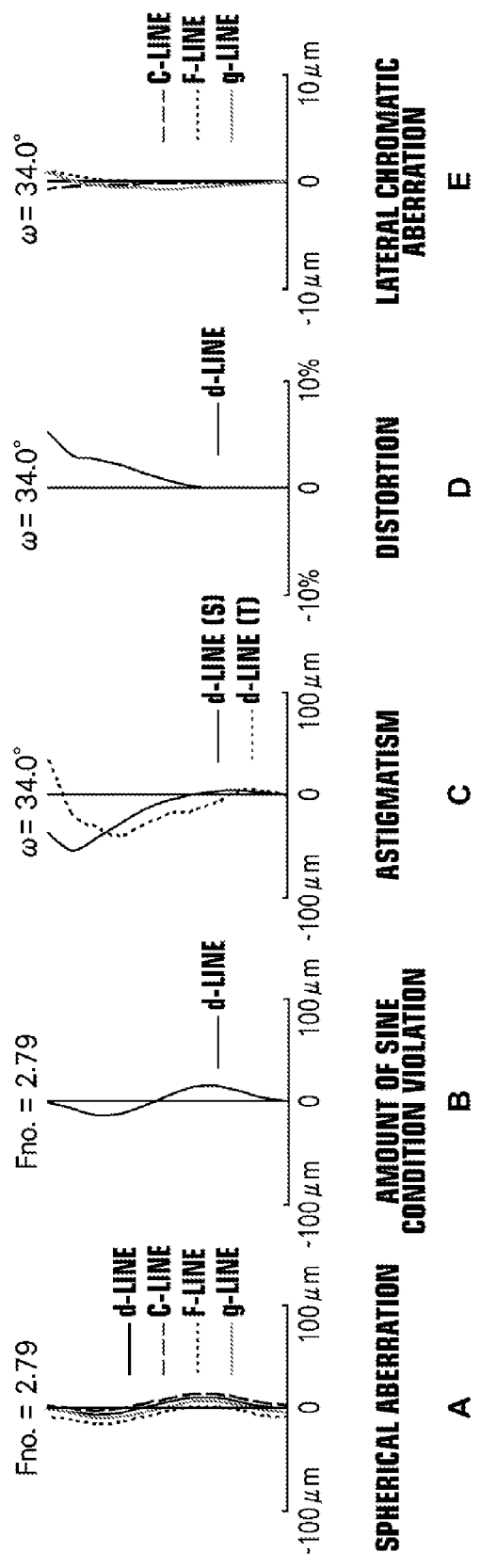
FIG. 11 is an aberration diagram illustrating various aberrations of an imaging lens according to Example 5 of the present invention, where Section A shows a spherical aberration, Section B shows an amount of sine condition violation, Section C shows astigmatism (curvature of field), Section D shows distortion, and Section E shows a lateral chromatic aberration.
Figure 12:
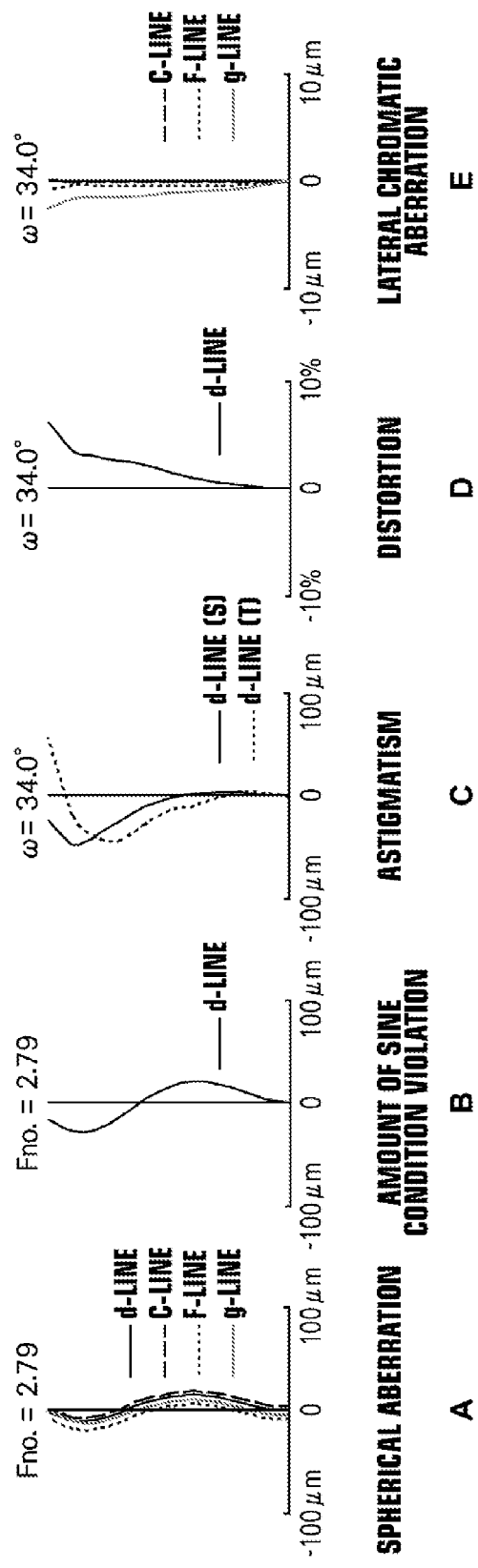
FIG. 12 is an aberration diagram illustrating various aberrations of an imaging lens according to Example 6 of the present invention, where Section A shows a spherical aberration, Section B shows an amount of sine condition violation, Section C shows astigmatism (curvature of field), Section D shows distortion, and Section E shows a lateral chromatic aberration.

Likewise, FIG. 8, Section A to E to FIG. 12, Section A to E show various aberrations of the imaging lenses of Examples 2 to 6.

Table 13 collectively shows values of the conditional expressions (1) and (3) of Examples 1 to 6 according to the present invention. In Table 13, Fno. is an F-number, f is the focal length of the whole system, Bf is a distance on the optical axis from the image side surface of the lens closest to the image side to the image plane (Bf corresponds to a back focal length), L is a distance on the optical axis from the object side surface of the first lens L1 to the image plane, and 2ω is a total angle of view. Bf is an air conversion length, that is, indicates a value which is calculated by air-converting the thickness of an optical member PP. Likewise, the back focal length portion of L uses an air conversion length. As can be seen from Table 13, all Examples 1 to 6 satisfy the conditional expressions (1) and (3).

It should be noted that the respective tables show numerical values which are rounded off to a predetermined decimal place. Regarding units of the numerical values, "°" is used for an angle, and "mm" is used for a length. However, those are just examples, and other appropriate units may be used since the optical system has the same optical performance even when being scaled up or scaled down.

As can be seen from the above-mentioned numerical value data and aberration diagrams, in each example, high imaging performance is achieved while the total length is reduced.

The imaging lens of the present invention is not limited to the above-mentioned embodiments and examples, and may be modified to various forms. For example, the values of the radius of curvature, the on-axis surface spacing, the refractive index, the Abbe number, the aspheric surface coefficient, and the like of the lens elements are not limited to the values shown in the numerical examples, and may have different values.

Further, in the description of each of all the examples, it is a premise that the imaging lens is used with fixed focus, but it may be possible to adopt a configuration in which focus is adjustable. For example, the imaging lens may be configured in such a manner that autofocusing is possible by extending the whole lens system or by moving some lenses on the optical axis. Further, the imaging lens of the present invention may be configured such that, in each lens which is formed in a meniscus shape in the vicinity of the optical axis, a surface with a large absolute value of the radius of curvature of the meniscus shape in the vicinity of the optical axis is set to be planar. In other words, the lens, which is formed in a meniscus shape in the vicinity of the optical axis, may be a plano-convex lens or a plano-concave lens of which a surface with a large absolute value of the radius of curvature of the meniscus shape is planar.

TABLE 1

EXAMPLE 1

| Si | Ri | Di | Ndj | vdj |
|---|---|---|---|---|
| *1 | 1.25123 | 0.490 | 1.54340 | 56.04 |
| *2 | −85.91480 | 0.091 | | |
| 3(APERTURE STOP) | ∞ | 0.000 | | |
| *4 | −23.50704 | 0.273 | 1.63551 | 23.90 |
| *5 | 2.92397 | 0.349 | | |
| *6 | −2.76774 | 0.406 | 1.63551 | 23.90 |
| *7 | −2.99031 | 0.561 | | |
| *8 | −1.42223 | 0.200 | 1.54340 | 56.04 |
| *9 | −1.01454 | 0.594 | | |
| *10 | 14.88108 | 0.200 | 1.54340 | 56.04 |
| *11 | 1.67926 | 0.500 | | |
| 12 | ∞ | 0.300 | 1.51680 | 64.20 |
| 13 | ∞ | 0.462 | | |
| 14 | ∞ | | | |

*ASPHERIC SURFACE

TABLE 2

EXAMPLE 1 • ASPHERIC SURFACE DATA

| SURFACE NUMBER | KA | A4 | A6 | A8 | A10 |
|---|---|---|---|---|---|
| 1 | −3.5265501E+00 | 2.9190562E−01 | −1.8762778E−01 | 1.4614789E−01 | 6.2258698E−03 |
| 2 | 1.1000009E+01 | 1.3143486E−02 | 5.5103579E−02 | −1.5456611E−01 | 2.9475952E−01 |
| 4 | −9.0000090E+00 | 6.5247669E−02 | 3.5636174E−02 | 1.5095808E−01 | −5.8396935E−01 |
| 5 | 1.1000009E+01 | 4.7123716E−02 | 4.2991079E−02 | 4.8513067E−02 | −1.0667783E−01 |
| 6 | 5.1238214E+00 | −1.2819542E−01 | −7.7877029E−02 | 2.5896284E−01 | −2.4813419E−01 |
| 7 | −1.2808129E+00 | −1.0159610E−01 | −6.0452884E−02 | 1.1771751E−01 | −4.6497424E−02 |
| 8 | 1.0874605E+00 | 1.0782875E−01 | 6.4061724E−02 | −1.8937429E−01 | 1.9663116E−01 |
| 9 | −1.5607581E+00 | 2.9513392E−02 | 1.0249242E−01 | −1.0926751E−01 | 4.4858286E−02 |
| 10 | −2.9000009E+01 | −8.3910947E−02 | 3.9014527E−02 | −1.1950953E−02 | 2.4345997E−03 |
| 11 | −9.0000089E+00 | −9.0120872E−02 | 3.7461949E−02 | −1.2606655E−02 | 2.4300184E−03 |

| | A12 | A14 |
|---|---|---|
| 1 | −4.7411334E−02 | −1.5296803E−02 |
| 2 | −3.3351121E−01 | 1.4510419E−01 |
| 4 | 8.1638830E−01 | −3.5207862E−01 |
| 5 | 4.6743601E−01 | −2.4504978E−01 |
| 6 | 6.4372891E−02 | — |
| 7 | 2.4367820E−02 | — |
| 8 | −9.8025674E−02 | 1.4531885E−02 |
| 9 | −9.9876110E−03 | 5.4216417E−04 |
| 10 | −2.7593752E−04 | 1.2370228E−05 |
| 11 | −2.4168500E−04 | 9.3477167E−06 |

TABLE 3

EXAMPLE 2

| Si | Ri | Di | Ndj | νdj |
|---|---|---|---|---|
| *1 | 1.21985 | 0.650 | 1.54340 | 56.04 |
| *2 | −19.32960 | 0.019 | | |
| *3 | −50.14063 | 0.203 | 1.63551 | 23.90 |
| *4 | 2.85352 | 0.059 | | |
| 5(APERTURE STOP) | ∞ | 0.347 | | |
| *6 | −2.75218 | 0.526 | 1.63551 | 23.90 |
| *7 | −3.15253 | 0.552 | | |
| *8 | −1.56264 | 0.338 | 1.54340 | 56.04 |

TABLE 3-continued

EXAMPLE 2

| Si | Ri | Di | Ndj | νdj |
|---|---|---|---|---|
| *9 | −1.20206 | 0.625 | | |
| *10 | −12.72238 | 0.200 | 1.54340 | 56.04 |
| *11 | 2.01524 | 0.500 | | |
| 12 | ∞ | 0.300 | 1.51680 | 64.20 |
| 13 | ∞ | 0.087 | | |
| 14 | ∞ | | | |

*ASPHERIC SURFACE

TABLE 4

EXAMPLE 2 • ASPHERIC SURFACE DATA

| SURFACE NUMBER | KA | A4 | A6 | A8 | A10 |
|---|---|---|---|---|---|
| 1 | −3.8420898E+00 | 3.2951474E−01 | −2.0525052E−01 | 1.6948452E−01 | −1.1209684E−02 |
| 2 | −1.0000009E+01 | 1.1796924E−01 | −1.1119895E−01 | 2.0745686E−01 | −2.4795691E−01 |
| 3 | 1.0000000E+01 | 1.0214963E−01 | −2.7410216E−02 | 2.3910481E−01 | −7.7901878E−01 |
| 4 | 8.2590464E+00 | 3.0281595E−02 | 8.2658998E−02 | −1.4429864E−02 | 1.1122259E−01 |
| 6 | −9.9999902E+00 | −8.5873701E−02 | −3.0785316E−01 | 8.7609895E−01 | −1.0180307E+00 |
| 7 | 7.7719996E+00 | 4.4334651E−02 | −6.2910042E−02 | 1.3616741E−01 | −4.0879099E−02 |
| 8 | −2.2808747E+00 | 3.8163556E−02 | −2.9664484E−02 | −1.7012040E−01 | 2.0110160E−01 |
| 9 | −2.8448612E+00 | 2.2246212E−02 | 1.1300139E−02 | −6.7691164E−02 | 4.1372374E−02 |
| 10 | −1.0000007E+01 | −2.5082778E−02 | −1.8460873E−02 | 2.3141628E−02 | −9.4514868E−03 |
| 11 | −1.0000006E+01 | −8.3461626E−02 | 4.0890004E−02 | −1.6194409E−02 | 4.2212011E−03 |

| | A12 | A14 |
|---|---|---|
| 1 | −2.3256893E−03 | −1.4351598E−02 |
| 2 | 6.1670633E−02 | 7.3514425E−02 |
| 3 | 1.0999936E+00 | −4.6463219E−01 |
| 4 | 4.1843630E−01 | 2.7086248E−02 |
| 6 | 4.4889302E−01 | — |
| 7 | 1.2327916E−02 | — |
| 8 | −1.0266240E−01 | 1.6674197E−02 |
| 9 | −1.0792564E−02 | 2.8071879E−04 |
| 10 | 1.6289584E−03 | −1.0067405E−04 |
| 11 | −6.5801516E−04 | 4.1586946E−05 |

TABLE 5

EXAMPLE 3

| Si | Ri | Di | Ndj | νdj |
|---|---|---|---|---|
| *1 | 1.21939 | 0.634 | 1.54340 | 56.04 |
| *2 | −16.01034 | 0.024 | | |
| *3 | −22.66325 | 0.200 | 1.63551 | 23.90 |
| *4 | 3.35058 | 0.056 | | |
| 5(APERTURE STOP) | ∞ | 0.325 | | |
| *6 | −2.72872 | 0.605 | 1.63551 | 23.90 |
| *7 | −3.12683 | 0.472 | | |
| *8 | −1.45769 | 0.337 | 1.54340 | 56.04 |
| *9 | −1.29326 | 0.735 | | |
| *10 | −11.48373 | 0.202 | 1.54340 | 56.04 |
| *11 | 2.24640 | 0.500 | | |
| 12 | ∞ | 0.300 | 1.51680 | 64.20 |
| 13 | ∞ | 0.016 | | |
| 14 | ∞ | | | |

*ASPHERIC SURFACE

TABLE 6

EXAMPLE 3 • ASPHERIC SURFACE DATA

| SURFACE NUMBER | KA | A4 | A6 | A8 | A10 |
|---|---|---|---|---|---|
| 1 | −3.7479079E+00 | 3.2599645E−01 | −2.0314144E−01 | 1.6827661E−01 | 3.9390055E−03 |
| 2 | −1.0000000E+01 | 1.0565895E−01 | −1.2898101E−01 | 1.9626070E−01 | −2.0021348E−01 |
| 3 | 1.0000000E+01 | 8.0739503E−02 | 5.6175812E−03 | 1.6603389E−01 | −6.7511992E−01 |
| 4 | 9.9369397E+00 | 2.0029302E−02 | 9.6381210E−02 | 3.1738336E−01 | −2.2912745E−02 |
| 6 | −7.1849228E+00 | −6.8745590E−02 | −3.4130743E−01 | 9.1904077E−02 | −9.9744367E−01 |
| 7 | 7.6732186E+00 | 5.6707326E−02 | −6.7285955E−02 | 1.4430643E−01 | −4.2607641E−02 |
| 8 | −2.7797290E+00 | 4.0581377E−02 | −5.3370313E−02 | −1.7758507E−01 | 2.0410163E−01 |
| 9 | −4.0141873E+00 | 1.7417825E−02 | 1.8553339E−02 | −7.9231391E−02 | 4.3813715E−02 |
| 10 | −1.0000000E+01 | −1.0243010E−03 | −3.7814154E−02 | 3.2220461E−02 | −1.1739444E−02 |
| 11 | −1.0000009E+01 | −7.3971505E−02 | 3.6781902E−02 | −1.5369751E−02 | 4.2119536E−03 |

| | A12 | A14 |
|---|---|---|
| 1 | −3.9073175E−02 | −1.3573368E−02 |
| 2 | 5.0960716E−02 | 7.2142391E−02 |
| 3 | 1.1101817E+00 | −4.6426637E−01 |
| 4 | 4.8862029E−01 | 3.9064466E−02 |
| 6 | 2.3107514E−01 | — |
| 7 | 1.0424032E−02 | — |
| 8 | −1.0597335E−01 | 1.7025259E−02 |
| 9 | −1.0977041E−02 | 4.4280873E−04 |
| 10 | 1.9022359E−03 | −1.1268871E−04 |
| 11 | −6.7309630E−04 | 4.2571818E−05 |

TABLE 7

EXAMPLE 4

| Si | Ri | Di | Ndj | νdj |
|---|---|---|---|---|
| *1 | 1.21421 | 0.620 | 1.54340 | 56.04 |
| *2 | −11.96651 | 0.023 | | |
| *3 | −13.64142 | 0.200 | 1.63551 | 23.90 |
| *4 | 3.78316 | 0.061 | | |
| 5(APERTURE STOP) | ∞ | 0.337 | | |
| *6 | −2.70776 | 0.594 | 1.63551 | 23.90 |
| *7 | −3.10284 | 0.442 | | |
| *8 | −1.56610 | 0.430 | 1.54340 | 56.04 |
| *9 | −1.43951 | 0.656 | | |
| *10 | −8.72121 | 0.251 | 1.54340 | 56.04 |
| *11 | 2.39998 | 0.300 | | |
| 12 | ∞ | 0.300 | 1.51680 | 64.20 |
| 13 | ∞ | 0.197 | | |
| 14 | ∞ | | | |

*ASPHERIC SURFACE

TABLE 8

EXAMPLE 4 • ASPHERIC SURFACE DATA

| SURFACE NUMBER | KA | A4 | A6 | A8 | A10 |
|---|---|---|---|---|---|
| 1 | −3.7250428E+00 | 3.2844826E−01 | −2.1022251E−01 | 1.7605834E−01 | 2.5083093E−03 |
| 2 | −9.9999999E+00 | 1.1322691E−01 | −1.2080116E−01 | 1.9576856E−01 | −2.1763299E−01 |
| 3 | 1.0000009E+01 | 9.5329921E−02 | 8.1139742E−03 | 1.6872933E−01 | −7.1637380E−01 |
| 4 | 9.3302426E+00 | 3.8726567E−02 | 7.5345456E−02 | 1.2011422E−01 | −2.2857969E−01 |
| 6 | −8.1423779E+00 | −6.0564327E−02 | −3.4733417E−01 | 9.9946226E−01 | −1.1633335E+00 |
| 7 | 7.7307400E+00 | 7.8602641E−02 | −5.8221090E−02 | 1.4678758E−01 | −4.5350062E−02 |
| 8 | −5.0620981E+00 | −3.2823569E−02 | 1.2761805E−02 | −1.9613557E−01 | 2.1482833E−01 |
| 9 | −5.0100235E+00 | 4.3426677E−03 | 2.1566569E−02 | −7.0092625E−02 | 4.2004290E−02 |
| 10 | −1.0000009E+01 | 2.9225028E−03 | −4.1772951E−02 | 3.3094620E−02 | −1.1672417E−02 |
| 11 | −1.0000009E+01 | −7.4997924E−02 | 3.4795594E−02 | −1.4653071E−02 | 4.0586241E−03 |

| | A12 | A14 |
|---|---|---|
| 1 | −4.1220850E−02 | −1.3731968E−02 |
| 2 | 5.5039962E−02 | 7.3490306E−02 |
| 3 | 1.1173509E+00 | −4.6378883E−01 |
| 4 | 4.8785031E−01 | 3.7935423E−02 |
| 6 | 2.0902204E−01 | — |
| 7 | 9.9110921E−03 | — |
| 8 | −1.1209210E−01 | 1.8009003E−02 |
| 9 | −1.0747341E−02 | 2.6013084E−04 |
| 10 | 1.8700662E−03 | −1.1042574E−04 |
| 11 | −6.5064959E−04 | 4.1316759E−05 |

TABLE 9

EXAMPLE 5

| Si | Ri | Di | Ndj | vdj |
|---|---|---|---|---|
| *1 | 1.20773 | 0.594 | 1.54340 | 56.04 |
| *2 | −11.58874 | 0.029 | | |
| *3 | −10.67454 | 0.200 | 1.63551 | 23.90 |
| *4 | 4.42919 | 0.066 | | |
| 5(APERTURE STOP) | ∞ | 0.332 | | |
| *6 | −2.70699 | 0.651 | 1.63551 | 23.90 |
| *7 | −3.10098 | 0.353 | | |
| *8 | −1.60063 | 0.441 | 1.54340 | 56.04 |

TABLE 9-continued

EXAMPLE 5

| Si | Ri | Di | Ndj | vdj |
|---|---|---|---|---|
| *9 | −1.59271 | 0.727 | | |
| *10 | −8.64197 | 0.266 | 1.54340 | 56.04 |
| *11 | 2.38980 | 0.300 | | |
| 12 | ∞ | 0.300 | 1.51680 | 64.20 |
| 13 | ∞ | 0.150 | | |
| 14 | ∞ | | | |

*ASPHERIC SURFACE

TABLE 10

EXAMPLE 5 • ASPHERIC SURFACE DATA

| SURFACE NUMBER | KA | A4 | A6 | A8 | A10 |
|---|---|---|---|---|---|
| 1 | −3.5834651E+00 | 3.2547709E−01 | −2.0038066E−01 | 1.7493514E−01 | 2.8894430E−03 |
| 2 | −9.9999999E+00 | 1.1556310E−01 | −1.1800061E−01 | 1.9502211E−01 | −2.1917177E−01 |
| 3 | 1.0000009E+01 | 1.0214117E−01 | 8.6334344E−03 | 1.6781966E−01 | −7.2170034E−01 |
| 4 | 6.1462571E+00 | 5.0384416E−02 | 8.6074510E−02 | 1.1535305E−01 | −2.2448733E−01 |
| 6 | −7.4688161E+00 | −6.0924783E−02 | −3.4808301E−01 | 1.0017378E+00 | −1.1765243E+00 |
| 7 | 7.7141057E+00 | 8.5525493E−02 | −5.8922931E−02 | 1.4628487E−01 | −4.6052648E−02 |
| 8 | −8.6680810E+00 | −7.0454064E−02 | 3.2931560E−02 | −1.9684875E−01 | 2.1564180E−01 |
| 9 | −8.0555481E+00 | −5.2378276E−03 | 2.3116142E−02 | −6.8410034E−02 | 4.1478876E−02 |
| 10 | −1.0000009E+01 | 2.3213450E−03 | −4.0535600E−02 | 3.2813761E−02 | −1.1722602E−02 |
| 11 | −1.0000009E+01 | −7.5205220E−02 | 3.5005779E−02 | −1.4644382E−02 | 4.0560402E−03 |

| | A12 | A14 |
|---|---|---|
| 1 | −4.0472185E−02 | −1.4123772E−02 |
| 2 | 5.4276034E−02 | 7.2448688E−02 |
| 3 | 1.1090218E+00 | −4.7040018E−01 |
| 4 | 4.2795655E−01 | −1.1980721E−01 |
| 6 | 1.2545861E−01 | — |
| 7 | 1.0151858E−02 | — |
| 8 | −1.1221968E−01 | 1.7341508E−02 |
| 9 | −1.0538487E−02 | 2.2582234E−04 |
| 10 | 1.8878066E−03 | −1.1159067E−04 |
| 11 | −6.5349175E−04 | 4.1551653E−05 |

TABLE 11

EXAMPLE 6

| Si | Ri | Di | Ndj | vdj |
|---|---|---|---|---|
| *1 | 1.20040 | 0.589 | 1.54340 | 56.04 |
| *2 | −9.00354 | 0.019 | | |
| *3 | −8.62003 | 0.208 | 1.63551 | 23.90 |
| *4 | 5.49804 | 0.063 | | |
| 5(APERTURE STOP) | ∞ | 0.320 | | |
| *6 | −2.62956 | 0.702 | 1.63551 | 23.90 |
| *7 | −3.00539 | 0.348 | | |
| *8 | −1.41074 | 0.534 | 1.54340 | 56.04 |
| *9 | −1.49681 | 0.560 | | |
| *10 | −8.27040 | 0.227 | 1.54340 | 56.04 |
| *11 | 2.49412 | 0.500 | | |
| 12 | ∞ | 0.300 | 1.51680 | 64.20 |
| 13 | ∞ | 0.037 | | |
| 14 | ∞ | | | |

*ASPHERIC SURFACE

TABLE 12

EXAMPLE 6 • ASPHERIC SURFACE DATA

| SURFACE NUMBER | KA | A4 | A6 | A8 | A10 |
|---|---|---|---|---|---|
| 1 | −3.4039219E+00 | 3.1710799E−01 | −1.8665154E−01 | 1.6711100E−01 | −1.6387743E−04 |
| 2 | −1.0000009E+01 | 1.0596222E−01 | −1.2409045E−01 | 1.9205791E−01 | −2.0011665E−01 |
| 3 | 8.8418537E+00 | 6.8071833E−02 | 1.6368196E−02 | 1.6066860E−01 | −6.9716982E−01 |
| 4 | 9.1097029E+00 | 1.4063035E−03 | 1.1191955E−01 | −8.0896404E−02 | 6.7381861E−02 |
| 6 | −6.0425633E+00 | −7.3428973E−02 | −2.9862418E−01 | 8.0670245E−01 | −1.1597352E+00 |
| 7 | 7.5291206E+00 | 9.6342648E−02 | −5.3659026E−02 | 1.3763003E−01 | −3.5971013E−02 |
| 8 | −2.3716635E+00 | 2.2509039E−02 | −5.0006025E−02 | −1.9509050E−01 | 2.1444020E−01 |
| 9 | −4.3162937E+00 | 4.3436121E−02 | 1.4743958E−02 | −7.3458498E−02 | 4.3242759E−02 |
| 10 | −1.0000002E+01 | −3.1491274E−05 | −2.8974342E−02 | 2.5991046E−02 | −9.7336131E−03 |
| 11 | −1.0000009E+01 | −8.5083781E−02 | 3.8835313E−02 | −1.6172374E−02 | 4.4884917E−03 |

| | A12 | A14 |
|---|---|---|
| 1 | −3.9898884E−02 | −3.0027109E−02 |
| 2 | 3.9834328E−02 | 9.2104115E−02 |
| 3 | 1.0814636E+00 | −4.7841083E−01 |
| 4 | 3.3321353E−01 | −8.3721369E−01 |
| 6 | 2.3987092E−02 | — |
| 7 | 1.1777915E−02 | — |
| 8 | −1.0468291E−01 | 1.2975240E−02 |
| 9 | −1.0867293E−02 | 7.5792009E−04 |
| 10 | 1.5855465E−03 | −9.3380253E−05 |
| 11 | −7.1894143E−04 | 4.4151769E−05 |

TABLE 13

VALUES IN CONDITIONAL EXPRESSIONS

| | EXPRESSION NUMBER | EXAMPLE 1 | EXAMPLE 2 | EXAMPLE 3 | EXAMPLE 4 | EXAMPLE 5 | EXAMPLE 6 |
|---|---|---|---|---|---|---|---|
| f | | 4.254 | 4.198 | 4.212 | 4.215 | 4.223 | 4.229 |
| Bf | | 1.160 | 0.785 | 0.714 | 0.694 | 0.648 | 0.735 |
| FNo. | | 2.39 | 2.79 | 2.80 | 2.79 | 2.79 | 2.79 |
| 2ω | | 68.0 | 68.0 | 68.0 | 68.0 | 68.0 | 68.0 |
| f1 | | 2.274 | 2.135 | 2.113 | 2.063 | 2.046 | 1.990 |
| f2 | | −4.076 | −4.242 | −4.580 | −4.640 | −4.900 | −5.252 |
| f3 | | −200.943 | −69.669 | −82.354 | −80.480 | −93.659 | −120.669 |
| f4 | | 5.554 | 7.208 | 12.255 | 14.924 | 28.749 | 38.119 |
| f5 | | −3.502 | −3.186 | −3.440 | −3.436 | −3.416 | −3.500 |
| f/f45 | 1 | −0.347 | −0.701 | −0.896 | −0.998 | −1.172 | −1.237 |
| f/f4 | 2 | 0.766 | 0.583 | 0.344 | 0.282 | 0.147 | 0.111 |
| (R3f − R3r)/(R3f + R3r) | 3 | −0.039 | −0.068 | −0.068 | −0.068 | −0.068 | −0.067 |

What is claimed is:

1. An imaging lens consisting of, in order from an object side, five lenses of:
a first lens that has a biconvex shape;
a second lens that has a negative refractive power;
a third lens that has a negative refractive power and has a meniscus shape which is concave toward the object side;
a fourth lens that has a positive refractive power; and
a fifth lens that has a negative refractive power and has an aspheric shape which is concave toward an image side and of which an image side surface has an extreme point,
wherein the following conditional expressions (1) and (2) are satisfied:

$$-2 < f/f45 < 0 \quad (1), \text{ and}$$

$$0 < f/f4 < 0.84 \quad (2), \text{ where}$$

f is a focal length of a whole system,
f45 is a composite focal length of the fourth and fifth lenses, and
f4 is a focal length of the fourth lens.

2. The imaging lens, as defined in claim 1, wherein the following conditional expression is further satisfied:

$$-1 < (R3f - R3r)/(R3f + R3r) < 0 \quad (3), \text{ where}$$

R3r is a paraxial radius of curvature of an image side surface of the third lens, and
R3f is a paraxial radius of curvature of an object side surface of the third lens.

3. The imaging lens, as defined in claim 1, wherein the second lens is concave toward the image side.

4. The imaging lens, as defined in claim 1, wherein the fourth lens has a meniscus shape which is concave toward the object side.

5. The imaging lens, as defined in claim 1, wherein among absolute values of respective focal lengths of the first to fifth lenses, the absolute value of the focal length of the third lens is the maximum.

6. The imaging lens, as defined in claim 1, wherein the following conditional expression is further satisfied:

$$-1.62 < f/f45 < -0.15 \quad (1\text{-}1), \text{ where}$$

f is the focal length of the whole system, and f45 is the composite focal length of the fourth and fifth lenses.

7. The imaging lens, as defined in claim 1, wherein the following conditional expression is further satisfied:

$$0.05 < f/f4 < 0.82 \quad (2\text{-}1),\text{ where}$$

f is the focal length of the whole system, and
f4 is the focal length of the fourth lens.

8. The imaging lens, as defined in claim 1, wherein the following conditional expression is further satisfied:

$$-0.5 < (R3f - R3r)/(R3f + R3r) < -0.01 \quad (3\text{-}1),\text{ where}$$

R3r is a paraxial radius of curvature of an image side surface of the third lens, and
R3f is a paraxial radius of curvature of an object side surface of the third lens.

9. The imaging lens, as defined in claim 1, wherein the following conditional expression is further satisfied:

$$-1.3 < f/f45 < -0.3 \quad (1\text{-}2),\text{ where}$$

f is the focal length of the whole system, and
f45 is the composite focal length of the fourth and fifth lenses.

10. The imaging lens, as defined in claim 1, wherein the following conditional expression is further satisfied:

$$0.1 < f/f4 < 0.8 \quad (2\text{-}2),\text{ where}$$

f is the focal length of the whole system, and
f4 is the focal length of the fourth lens.

11. The imaging lens, as defined in claim 1, wherein the following conditional expression is further satisfied:

$$-0.1 < (R3f - R3r)/(R3f + R3r) < -0.03 \quad (3\text{-}2),\text{ where}$$

R3r is a paraxial radius of curvature of an image side surface of the third lens, and
R3f is a paraxial radius of curvature of an object side surface of the third lens.

12. An imaging apparatus comprising:
the imaging lens, as defined in claim 1.

\* \* \* \* \*